United States Patent
Itoh et al.

(10) Patent No.: US 9,808,771 B2
(45) Date of Patent: Nov. 7, 2017

(54) MEMBRANES

(71) Applicants: Fujifilm Manufacturing Europe B.V., Tilburg (NL); Fujifilm Corporation, Tokyo (JP)

(72) Inventors: Shigehide Itoh, Tilburg (NL); Petrus Van Kessel, Tilburg (NL); Yujiro Itami, Tilburg (NL)

(73) Assignees: Fujifilm Manufacturing Europe B.V. (NL); Fujifilm Corporation (JP)

( * ) Notice: Subject to any disclaimer, the term of this patent is extended or adjusted under 35 U.S.C. 154(b) by 0 days.

(21) Appl. No.: 15/026,977

(22) PCT Filed: Sep. 30, 2014

(86) PCT No.: PCT/GB2014/052945
§ 371 (c)(1),
(2) Date: Apr. 3, 2016

(87) PCT Pub. No.: WO2015/049502
PCT Pub. Date: Apr. 9, 2015

(65) Prior Publication Data
US 2016/0256833 A1    Sep. 8, 2016

(30) Foreign Application Priority Data
Oct. 3, 2013  (GB) .................................. 1317521.1

(51) Int. Cl.
*B01D 53/22* (2006.01)
*B01D 69/12* (2006.01)
(Continued)

(52) U.S. Cl.
CPC ........... *B01D 69/12* (2013.01); *B01D 53/228* (2013.01); *B01D 67/0002* (2013.01);
(Continued)

(58) Field of Classification Search
CPC .............. B01D 67/009; B01D 2223/34; B01D 2325/24; B01D 71/70; B01D 69/105;
(Continued)

(56) References Cited

U.S. PATENT DOCUMENTS 3,874,986 A    4/1975    Browall et al.
3,899,309 A    8/1975    Hoehn et al.
(Continued)

FOREIGN PATENT DOCUMENTS

EP          134055 A2        3/1985
WO      2007018425 A1        2/2007
(Continued)

OTHER PUBLICATIONS

Zhou et al., "Perfluorocyclobutyl polymer thin-film composite membranes for CO2 separation", Journal of Membrane Science, vol. 450, Sep. 25, 2013, pp. 478-486.
(Continued)

*Primary Examiner* — Anthony Shumate
(74) *Attorney, Agent, or Firm* — Banner & Witcoff, Ltd.

(57) ABSTRACT

A composite gas membrane comprising: a) a porous support; b) an activated gutter layer; c) a discriminating layer located on the gutter layer; and d) optionally a protective layer on the discriminating layer; wherein the said layers remain in place when a peeling force of 2.5 N/1.5 cm is applied to the outermost of said layers.

18 Claims, 1 Drawing Sheet

(51) Int. Cl.
*B01D 67/00* (2006.01)
*B01D 69/02* (2006.01)
*B01D 69/10* (2006.01)
*B01D 71/64* (2006.01)
*B01D 71/70* (2006.01)

(52) U.S. Cl.
CPC ....... *B01D 67/009* (2013.01); *B01D 67/0093* (2013.01); *B01D 69/02* (2013.01); *B01D 69/10* (2013.01); *B01D 69/105* (2013.01); *B01D 69/127* (2013.01); *B01D 71/64* (2013.01); *B01D 71/70* (2013.01); *B01D 2313/44* (2013.01); *B01D 2323/34* (2013.01); *B01D 2325/24* (2013.01)

(58) Field of Classification Search
CPC B01D 2313/44; B01D 67/0002; B01D 69/12; B01D 71/64; B01D 69/127; B01D 53/228; B01D 69/02; B01D 69/10; B01D 67/0093
See application file for complete search history.

(56) References Cited

U.S. PATENT DOCUMENTS

| | | |
|---|---|---|
| 4,581,043 A | 4/1986 | van der Scheer |
| 4,717,394 A | 1/1988 | Hayes |
| 5,085,676 A | 2/1992 | Ekiner et al. |
| 5,286,280 A | 2/1994 | Chiou |
| 5,650,453 A * | 7/1997 | Eckberg .................. C08K 5/06 522/148 |
| 5,733,663 A | 3/1998 | Scheunemann et al. |
| 5,779,050 A * | 7/1998 | Kocher .................. B32B 27/08 206/497 |
| 5,919,547 A * | 7/1999 | Kocher .................. B32B 7/06 426/127 |
| 6,248,380 B1 * | 6/2001 | Kocher .................. B32B 7/06 206/484 |
| 2010/0006497 A1* | 1/2010 | Thottupurathu ... B01D 67/0027 210/505 |
| 2011/0192283 A1* | 8/2011 | Shimatani .............. B01D 65/10 96/11 |
| 2015/0298064 A1* | 10/2015 | Takagi .................. B01D 69/10 210/488 |

FOREIGN PATENT DOCUMENTS

| | | |
|---|---|---|
| WO | 2014001790 A1 | 1/2014 |
| WO | 2014001791 A1 | 1/2014 |
| WO | 2014001792 A1 | 1/2014 |

OTHER PUBLICATIONS

International Preliminary Report on Patentability issued in corresponding International Application No. PCT/GB2014/052945, dated Apr. 5, 2016.
International Search Report and Written Opinion issued in corresponding International Application No. PCT/GB2014/052945, mailed Dec. 22, 2014.

* cited by examiner

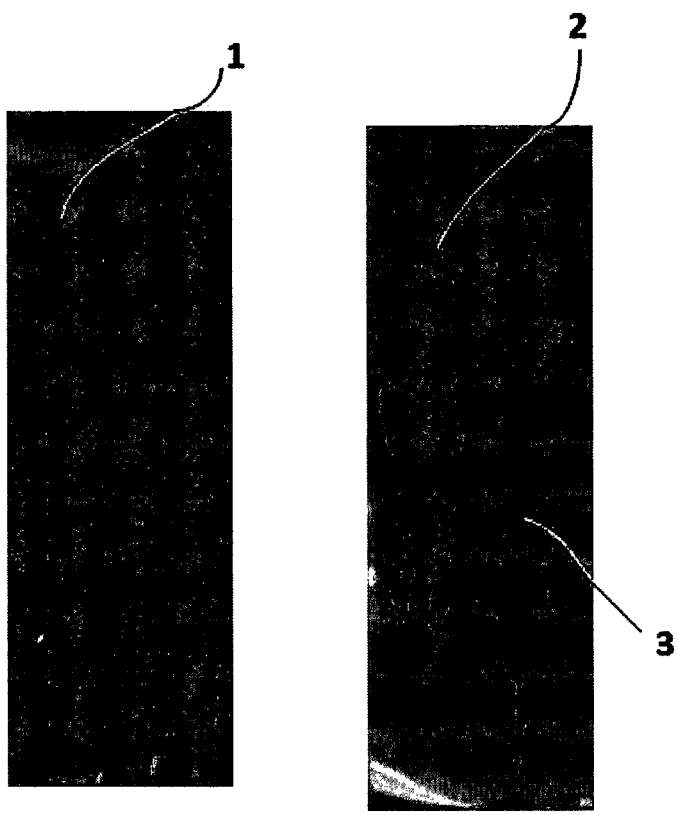

MEMBRANES

RELATED APPLICATION DATA

This application is a National Stage Application under 35 U.S.C. 371 of co-pending PCT application number PCT/GB2014/052945 designating the United States and filed Sep. 30, 2014; which claims the benefit of GB application number 1317521.1 and filed Oct. 3, 2013 each of which are hereby incorporated by reference in their entireties.

This invention relates to composite membranes and to their use for the separation of gases.

Composite membranes comprising a porous support, a gas-permeable polymeric layer (often referred to as a "gutter layer") and an outer discriminating layer are known in the art. Each of these components is an important contributor to the overall performance of the membrane. The porous support provides the membrane with mechanical strength; the discriminating layer selectively allows some gases to permeate through the membrane more quickly than others; while the gutter layer provides a smooth, gas-permeable intermediate surface between the porous support and the discriminating layer.

Typically a mixture of gasses is brought into contact with one side of the composite membrane and at least one of the gases permeates through the discriminating layer faster than the other gas(es). In this way, a feed gas stream is separated into two streams, one of which is enriched in the selectively permeating gas(es) and the other of which is depleted.

The present invention aims to provide composite membranes having good flux, selectivity and robustness.

According to a first aspect of the present invention there is provided a composite membrane comprising:
a) a porous support;
b) an activated gutter layer;
c) a discriminating layer; and
d) optionally a protective layer;
wherein the said layers remain in place when a peeling force of 2.5 N/1.5 cm is applied to the outermost of said layers.

When increasing amounts of peeling force are applied to a composite membrane comprising a gutter layer, a discriminating layer and optionally a protective layer, the layer which is most weakly adhered to the underlying layer is removed first, together with any overlying layers. For example, if the bond between the discriminating layer and the gutter layer is weaker than the bond between the gutter layer and porous support and the bond between the protective layer (when present) and the discriminating layer, then applying increasing amounts of peeling force will eventually remove the discriminating layer and the protective layer (when present). Similarly, if the bond between the gutter layer and the porous support is the weakest of all bonds between the various layers, a peeling test using increasing amounts of peeling force will remove all layers from the porous support. Finally, when the composite membrane comprises a protective layer and the bond between the protective layer and the discriminating layer is weaker than the bonds between all other layers, a peeling test using increasing amounts of peeling force will remove only the protective layer.

One may determine the peeling force required to remove one or more of the layers from the composite membrane by applying a length of adhesive tape of width 1.5 cm to the composite membrane and peeling the tape off at an angle of 180° and speed of 5 cm/min, ignoring the first 2.5 cm of tape peeled off and visually inspecting the next 5 cm of peeling for the presence of any layers removed from the composite membrane. A tensile testing machine may be used to measure the peeling force required to remove one or more of the layers under these conditions, for example one may use a Zwick Z010 tensile testing machine. The absence of membrane layer(s) on the adhesive test indicates that all of the layers present on the porous support have remained in place at the applied peeling force. When layers from the composite start to appear on the adhesive tape, this indicates that one or more of the layers present on the porous support have not remained in place at the applied peeling force. More information is provided in ISO 29862:2007 and in the Examples below.

BRIEF DESCRIPTION OF THE DRAWING

In the accompanying drawing:

FIG. 1 illustrates two lengths of adhesive tape which have been used to determine whether layers of composite membranes remain in place when a peeling force of 2.5 N/1.5 cm is applied thereto.

FIG. 1 shows the adhesive face of adhesive tapes (1) and (2) after they have been applied to the outer layer of a composite membrane and removed. In the case of adhesive tape (1), the layers of the composite membrane remained in place on the composite membrane despite a peeling force of 2.5 N/1.5 cm being applied to the composite membrane. Therefore in the case of adhesive tape (1), there are no layers visible on the adhesive surface of the tape. In contrast, in the case of tape (2), when the same peeling force was applied to a comparative composite membrane, one or more layers were removed from the comparative composite membrane and can be seen on tape (2) as the lighter area (3).

The term 'curing' and the term 'crosslinking' are used interchangeably in this document.

Surprisingly the composite membranes according to the present invention have a particularly good combination of high selectivity and good robustness.

The primary purpose of the porous support is to provide mechanical strength to the membrane without materially reducing gas flux. Therefore the porous support is typically open pored (before it is converted into the composite membrane), relative to the discriminating layer.

The porous support may be, for example, a microporous organic or inorganic membrane, or a woven or non-woven fabric. Preferably the porous support is organic. The porous support may be constructed from any suitable material. Examples of such materials include polysulfones, polyethersulfones, polyimides, polyetherimides, polyamides, polyamideimides, polyacrylonitrile, polycarbonates, polyesters, polyacrylates, cellulose acetate, polyethylene, polypropylene, polyvinylidenefluoride, polytetrafluoroethylene, poly (4-methyl 1-pentene) and especially polyacrylonitrile.

One may use a commercially available porous sheet material as the support, if desired. Alternatively one may prepare the porous support using techniques generally known in the art for the preparation of microporous materials. One may also use a porous support which has been subjected to a corona discharge treatment, glow discharge treatment, flame treatment, ultraviolet light irradiation treatment or the like, e.g. for the purpose of improving its wettability and/or adhesiveness.

The porous support preferably possesses pores which are as large as possible, consistent with providing a smooth surface for the gutter layer.

The porous support preferably has an average pore size of at least about 50% greater than the average pore size of the discriminating layer, more preferably at least about 100% greater, especially at least about 200% greater, particularly at least about 1000% greater than the average pore size of the discriminating layer.

The pores passing through the porous support typically have an average diameter of 0.001 to 10 µm, preferably 0.01 to 1 µm. The pores at the surface of the porous support typically have a diameter of 0.001 to 0.1 µm, preferably 0.005 to 0.05 µm. The pore diameter may be determined by, for example, viewing the surface of the porous support before it is converted to the membrane by scanning electron microscopy ("SEM") or by cutting through the support and measuring the diameter of the pores within the porous support, again by SEM.

The porosity at the surface of the porous support may also be expressed as a % porosity, i.e.

$$\% \text{ porosity} = 100\% \times \frac{(\text{area of the surface which ismissing due to pores})}{(\text{total surface area})}$$

The areas required for the above calculation may be determined by inspecting the surface of the porous support by SEM. Thus, in a preferred embodiment, the porous support has a % porosity>1%, more preferably >3%, especially >10%, more especially >20%.

The porosity of the porous support may also be expressed as a $CO_2$ gas permeance (units are $m^3(STP)/m^2 \cdot s \cdot kPa$). When the membrane is intended for use in gas separation the porous support preferably has a $CO_2$ gas permeance of 5 to $150 \times 10^{-5}$ $m^3(STP)/m^2 \cdot s \cdot kPa$, more preferably of 5 to 100, most preferably of 7 to $70 \times 10^{-5}$ $m^3(STP)/m^2 \cdot s \cdot kPa$.

Alternatively the porosity may be characterised by measuring the $N_2$ gas flow rate through the porous support. Gas flow rate can be determined by any suitable technique, for example using a Porolux™ 1000 device, available from Porometer.com. Typically the Porolux™ 1000 is set at the maximum pressure (about 34 bar) and one measures the flow rate (L/min) of $N_2$ gas through the porous support under test. The $N_2$ flow rate through the porous support at a pressure of about 34 bar for an effective sample area of 2.69 $cm^2$ (effective diameter of 18.5 mm) is preferably >1 L/min, more preferably >5 L/min, especially >10 L/min, more especially >25 L/min. The higher of these flow rates are preferred because this reduces the likelihood of the gas flux of the resultant membrane being reduced by the porous support.

The above pore sizes and porosities refer to the porous support before it has been converted into the composite membrane of the present invention.

The porous support preferably has an average thickness of 20 to 500 µm, preferably 50 to 400 µm, especially 100 to 300 µm.

The gutter layer performs the function of providing a smooth and continuous surface for the discriminating layer. Preferably the gutter layer comprises a polymer and/or dialkylsiloxane groups.

The gutter layer preferably has an average thickness 25 to 1200 nm, preferably 30 to 800 nm, especially 50 to 650 nm, e.g. 70 to 120 nm, 130 to 170 nm, 180 to 220 nm, 230 to 270 nm, 300 to 360 nm, 380 to 450 nm, 470 to 540 nm or 560 to 630 nm.

The thickness of the gutter layer may be determined by cutting through the membrane and examining its cross section by SEM. The part of the gutter layer which is present within the pores of the support is not taken into account.

The gutter layer is preferably non-porous, i.e. any pores present therein have an average diameter<1 nm, although it is gas permeable and usually has low ability to discriminate between gases.

Dialkylsiloxane groups may be incorporated into the gutter layer by using a polymerisable dialkylsiloxane as one of the components of a curable composition for forming the gutter layer. The polymerisable dialkylsiloxane (which may alternatively be referred to as a polymerisable compound comprising dialkylsiloxane groups) is optionally a monomer having a dialkylsiloxane group or a polymerisable oligomer or polymer having dialkylsiloxane groups. For example, one may prepare the gutter layer from a radiation-curable composition containing a partially crosslinked, radiation-curable polymer comprising dialkylsiloxane groups, as described in more detail below. Typical dialkylsiloxane groups are of the formula $—\{O—Si(CH_3)_2\}_n—$ wherein n is at least 1, e.g. 1 to 100. Poly(dialkylsiloxane) compounds having terminal vinyl groups are also available and these may be incorporated into the gutter layer by a polymerisation processes.

Preferably the gutter layer is free from groups of formula $Si—C_6H_5$.

In one embodiment the gutter layer does not contain Sb and Ti in a molar ratio of 0.41. More preferably the gutter layer does not contain Sb and Ti in a molar ratio from 0.40 to 0.42.

Preferably the gutter layer comprises groups of formula $—O—CO—(CH_2)_n—Si—C(OR^1)_2—$ wherein n is from 1 to 3 (preferably 2) and $R^1$ is $C_{1-4}$-alkyl (preferably methyl). Such groups may be incorporated into the gutter layer through the use of appropriate monomers, for example monomers comprising two groups of formula $HO_2C—(CH_2)_n—Si—C(OR^1)_2—$ (wherein n and $R^1$ are as hereinbefore defined). Such monomers can act as crosslinking agents for polyepoxy compounds and are commercially available, for example X-22-162C from Shin-Etsu Chemical Co.

Irradiation of a curable composition (sometimes referred to as "curing" in this specification) to form the gutter layer may be performed using any source which provides the wavelength and intensity of radiation necessary to cause the radiation-curable composition to polymerise and thereby form the gutter layer on the porous support. For example, electron beam, ultraviolet (UV), visible and/or infra red radiation may be used to irradiate (cure) the radiation-curable composition, with the appropriate radiation being selected to match the components of the composition.

Preferably irradiation of a radiation-curable composition used to form the gutter layer begins within 7 seconds, more preferably within 5 seconds, most preferably within 3 seconds, of the radiation-curable composition being applied to the porous support.

Suitable sources of UV radiation include mercury arc lamps, carbon arc lamps, low pressure mercury lamps, medium pressure mercury lamps, high pressure mercury lamps, swirlflow plasma arc lamps, metal halide lamps, xenon lamps, tungsten lamps, halogen lamps, lasers and ultraviolet light emitting diodes. Particularly preferred are UV emitting lamps of the medium or high pressure mercury vapour type. In addition, additives such as metal halides may be present to modify the emission spectrum of the lamp. In most cases lamps with emission maxima between 200 and 450 nm are particularly suitable.

The energy output of the irradiation source is preferably from 20 to 1000 W/cm, preferably from 40 to 500 W/cm but may be higher or lower as long as the desired exposure dose can be realized.

Optionally one may apply a radiation curable composition to the porous support, then irradiate the radiation curable composition to form the gutter layer and then apply the discriminating layer thereto. Alternatively, one may apply the radiation-curable composition to the porous support and apply the discriminating layer (or the chemicals used to prepare the discriminating layer) on top of the radiation-curable composition and then perform the irradiation step for both layers simultaneously.

In order to produce a sufficiently flowable composition for use in a high speed coating machine, the radiation-curable composition used to form the gutter layer preferably has a viscosity below 4000 mPa·s when measured at 25° C., more preferably from 0.4 to 1000 mPa·s when measured at 25° C. Most preferably the viscosity of the radiation-curable composition is from 0.4 to 500 mPa·s when measured at 25° C. For coating methods such as slide bead coating the preferred viscosity is from 1 to 100 mPa·s when measured at 25° C. The desired viscosity is preferably achieved by controlling the amount of solvent in the radiation-curable composition and/or by appropriate selection of the components of the radiation-curable composition and their amounts.

In the multi-layer coating methods mentioned above, one may optionally apply a lower inert solvent layer to the porous support followed by applying the radiation-curable composition used to form the gutter layer.

With suitable coating techniques, coating speeds of at least 5 m/min, e.g. at least 10 m/min or even higher, such as 15 m/min, 20 m/min, or even up to 100 m/min, can be reached. In a preferred embodiment the radiation-curable composition (and also the discriminating layer and protective layer, when present) is applied to the support at one of the aforementioned coating speeds.

The thickness of the gutter layer on the support may be influenced by controlling the amount of curable composition per unit area applied to the support. For example, as the amount of curable composition per unit area increases, so does the thickness of the resultant gutter layer. The same principle applies to formation of the discriminating layer and protective layer, when present.

While it is possible to prepare the membranes of the invention on a batch basis with a stationary porous support, it is much preferred to prepare them on a continuous basis using a moving porous support, e.g. the porous support may be in the form of a roll which is unwound continuously or the porous support may rest on a continuously driven belt. Using such techniques the radiation-curable composition can be applied to the porous support on a continuous basis or it can be applied on a large batch basis. Removal of any inert solvent present in the radiation-curable composition can be accomplished at any stage after the radiation-curable composition has been applied to the support, e.g. by evaporation.

Thus in a preferred process for making the membranes of the invention, the radiation-curable composition is applied continuously to the porous support by means of a manufacturing unit comprising a radiation-curable composition application station, curing is performed using an irradiation source located downstream from the radiation-curable composition application station to form a gutter layer, the discriminating layer (when present) is formed on the gutter layer by a discriminating layer application station, the protective layer (when present) is formed on the discriminating layer by a protective layer application station, and the resultant membrane is collected at a collecting station, wherein the manufacturing unit comprises a means for moving the porous support from the first to the last station (e.g. a set of motor driven pass rollers guiding the porous support through the coating line) and a means for activating the gutter layer (e.g. a source of high energy species, as discussed in more detail below).

One may form the discriminating layer on the gutter layer (the activated gutter layer sometimes being referred to simply as "the gutter layer" herein for brevity) using analogous techniques to those described above for forming the gutter layer on the porous support. Typically, however, one will select the coating conditions such that the discriminating layer is much thinner than the gutter layer. For example one may apply to the gutter layer a much thinner coating of a composition which forms the discriminating layer than was used to form the gutter layer.

By using an activated gutter layer one may achieve a good coverage of the discriminating layer on the surface of the gutter layer. The gutter layer may be activated by treating the gutter layer with, or exposing it to, a high energy species, for example species such as radicals, ions and/or molecules in an excited state. The gutter layer is preferably activated by a process comprising corona treatment, plasma treatment (e.g. at atmospheric or reduced pressure), flame treatment and/or ozone treatment. For the corona or plasma treatment generally an energy dose of 0.5 to 100 $kJ/m^2$ will be sufficient, for example about 1, 3, 5, 8, 15, 25, 45, 60, 70 or 90 $kJ/m^2$. Suitable methods for activating the gutter layer include those described for polymers in Chapter 6 of the book entitled "Polymer surfaces From Physics to Technology", revised and updated edition 1998, by Fabio Garbassi, Marco Morra and Ernesto Occhiello (Publisher: John Wiley & Sons).

In order to achieve a good adhesion of the discriminating layer to the gutter layer, the composition used to form the discriminating layer preferably comprises active groups, for example carboxyl-groups, epoxy groups, oxetane groups, carboxylic acid groups, sulphonic acid groups, hydroxyl groups, trialkoxysilyl groups or thiol groups. More preferably the polymer composition used to form the discriminating layer comprises a polyimide polymer having a pendant carboxyl group or carboxylic acid groups.

If desired, the discriminating layer may be formed on the gutter layer by a radiation curing process. In this case, one may apply the discriminating layer to the gutter layer in an analogous manner to how the gutter layer was applied to the porous support, but applying a thinner layer and using a curable composition which results in a layer which can discriminate between gases.

One may locate a radiation-curable composition application station at an upstream position relative to an irradiation source and the irradiation source may be located at an upstream position relative a discriminating layer application station (when present).

While it is preferred for the gutter layer to be pore-free, in composite membranes comprising a discriminating layer the presence of some pores usually does not reduce the permselectivity of the final membrane because the discriminating layer is often able to fill minor defects in the gutter layer.

The discriminating layer is present on the gutter layer. Typically the discriminating layer is a cross-linked discriminating layer. Preferably the discriminating layer contains amine groups and/or silicon atoms. One may prepare a discriminating layer containing amine groups by including an amine in the ingredients used to form the discriminating layer. Suitable amines include tertiary, secondary and preferably primary amines, especially primary alkylamines. Thus the discriminating layer preferably comprises one or more amines.

In an especially preferred embodiment, the discriminating layer further contains silicon atoms. Silicon atoms may be included in the discriminating layer by, for example, including an amine comprising a silicon atom in the ingredients used to form the discriminating layer. For example, the amine optionally comprises a silicon atom and an amine group linked together by an alkylene group (e.g. a group of formula (—$C_mH_{2m}$— wherein m is from 2 to 10, preferably 2 to 6, especially 3). In this way, one may obtain a discriminating layer comprising a group comprising an amine group, a silicon atom and an alkylene group (e.g. a group of formula (—$C_mH_{2m}$— wherein m is from 2 to 10, preferably 2 to 6, especially 3) wherein the silicon atom and the amine group are linked together by the alkylene group.

Discriminating layers comprising an amine group and a silicon atom may be obtained from compositions comprising an alkoxy silane compound comprising an amine group. Thus, in a preferred embodiment, the ingredients used to form the discriminating layer comprise an alkoxy silane compound comprising an amine group, e.g. a mono-, di- or tri-alkoxy silane compound an amine group (especially 1, 2 or 3 amine groups).

Examples of alkoxy silane compounds comprising an amine group include n-(3-acryloxy-2-hydroxypropyl)-3-aminopropyltriethoxysilane, n-(3-methacryloxy-2-hydroxypropyl)-3-aminopropyltriethoxysilane, 3-aminopropyltriethoxysilane, 3-aminopropyltrimethoxysilane, 4-aminobutyltriethoxysilane, 3-aminopropyltris(methoxyethoxy-ethoxy)silane, 11-aminoundecyltriethoxysilane, 2-(4-pyridylethyl)triethoxysilane, 2-(trimethoxysilylethyl) pyridine, 3-aminopropylmethyldiethoxysilane, 3-aminopropyldiisopropylethoxy silane, 3-aminopropyldimethylethoxysilane, n-(2-aminoethyl)-3-aminopropyltrimethoxysilane n-[3-trimethoxysilyl)propyl]ethylenediamine, n-(2-aminoethyl)-3-aminopropyltriethoxysilane, n-(6-aminohexyl) aminomethyl triethoxysilane, n-(6-aminohexyl)aminopropyl trimethoxysilane, n-(2-aminoethyl)-11-aminoundecyl trimethoxysilane, (aminoethylaminomethyl)phenethyl trimethoxysilane, n-3-[(amino(polypropylenoxy)]amino propyltrimethoxysilane, n-(2-aminoethyl)-3-aminopropylmethyl dimethoxysilane, n-(2-aminoethyl)-3-aminoisobutyl methyldimethoxysilane, (aminoethylamino)-3-isobutyldi methylmethoxysilane, (3-trimethoxysilylpropyl)diethylene triamine, n-butylaminopropyltrimethoxy silane, n-ethylaminoisobutyltrimethoxy silane, n-methylaminopropyltrimethoxy silane, n-methylaminopropyltrimethoxy silane, (cyclohexylaminomethyl)triethoxysilane, n-cyclohexylaminopropyltrimethoxysilane, n-ethylaminoisobutylmethyl diethoxysilane, n-methylaminopropylmethyl dimethoxysilane, bis(2-hydroxyethyl)-3-aminopropyl triethoxysilane, diethylaminomethyltriethoxysilane, (n, n-diethyl-3-aminopropyl)trimethoxysilane, 3-(n, n-dimethylaminopropyl) trimethoxy silane, bis(triethoxysilylpropyl)amine, bis (trimethoxysilylpropyl)amine, bis[(3-trimethoxysilyl) propyl] ethylenediamine, bis[(3-trimethoxysilyl)propyl] ethylenediamine, bis(methyldiethoxysilylpropyl)amine, n,n-dioctyl-n'-triethoxysilylpropyl urea, n-allyl-aza-2,2-dimethoxysilacyclopentane, 2,2-dimethoxy-1,6-diaza-2-silacyclooctane, and mixtures comprising two or more thereof. The aforementioned compounds are commercially available, e.g. from Gelest, Inc. and ABCR GmbH & Co. KG.

Still further, the discriminating layer preferably comprises —$CF_3$ groups.

Preferably the discriminating layer comprises a polymer, for example a polyimide, especially a polyimide comprising trifluoromethyl groups and optionally carboxylic acid groups. Preferably the discriminating layer comprises polymer comprising groups of the Formula (1) wherein Ar is an aromatic group and R is a pendant carboxylic acid group, a sulphonic acid group, a hydroxyl group, a thiol group, an epoxy group or an oxetane group:

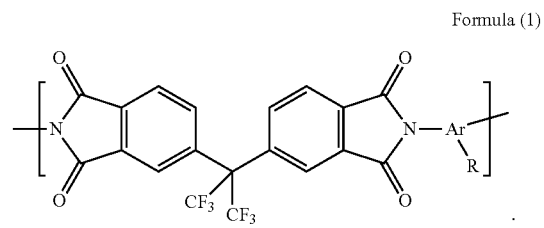

Formula (1)

Preferably the discriminating layer has been obtained from a composition which is free from silane compounds comprising acetoxy-groups.

In one embodiment, the gutter layer comprises carboxy groups. In this way, adhesion of the discriminating layer to the gutter layer may be enhanced due to the attraction between the amine groups in the discriminating layer and the oppositely charged carboxy groups in the gutter layer.

The average thickness of the discriminating layer is preferably 20 nm to 2 µm, more preferably 30 nm to 1 µm, especially 40 to 200 nm.

In one embodiment the composite membrane further comprises a protective layer d) on the discriminating layer. The protective layer is preferably highly permeable to the gases or vapors that are to be separated. Preferably the protective layer comprises dialkylsiloxane groups and/or a polyamine. The protective layer optionally has surface characteristics which influence the functioning of the composite membrane, for example by making the membrane surface more hydrophilic. The function of the protective layer is to protect the discriminating layer against damage and/or to seal any defects present in the discriminating layer.

The method used to measure the peeling force required to remove the discriminating layer from the composite membrane is exactly the same irrespective of whether or not the composite membrane comprises a protective layer on the discriminating layer. The average thickness of the protective layer is preferably 20 nm to 1 µm, more preferably 30 nm to 0.8 µm, especially 40 nm to 0.5 µm.

In a preferred embodiment the composition used to form the protective layer is identical to the composition used to form the gutter layer. In another embodiment the protective layer comprises carboxylic acid groups. This embodiment is preferred because the presence of carboxylic acid groups in the protective layer can improve its adhesion to the discriminating layer when the discriminating layer contains amine groups. Thus the process for preparing the composite membranes of the present invention is preferably performed such that amine groups present in the discriminating layer are reacted with carboxylic acid groups present in the protective layer. Such a reaction may be performed under mild conditions if desired, whereby non-covalent bonding between said carboxylic acid groups and amine groups occurs.

The radiation-curable composition used to form the gutter layer (and also optionally the protective layer, when present) preferably comprises:

(1) 0.5 to 25 wt % of radiation-curable component(s), at least one of which comprises dialkylsiloxane groups;
(2) 0 to 5 wt % of a photo-initiator;
(3) 70 to 99.5 wt % of inert solvent; and
(4) 0.01 to 5 wt % of metal complex;
wherein the composition has a molar ratio of metal:silicon of at least 0.0005.

Preferably the composition (and the gutter layer) has a molar ratio of metal:silicon of 0.001 to 0.1, more preferably 0.003 to 0.03.

Preferably the radiation-curable composition used to form the gutter layer comprises 0.02 to 0.6 mmol (more preferably 0.03 to 0.3 mmol) of component (4) per gram of component (1).

The molar ratio of metal:silicon of the gutter layer is generally the same as the molar ratio of metal:silicon of the composition used to form the gutter layer. Thus one may calculate the molar ratio of metal:silicon from the composition used to form the gutter layer.

For convenience, one may determine the number of moles of silicon per gram of gutter layer (Total $Mol_{si}$/g) by adding together the weight average number of moles of silicon in each polymerisable component used to form the gutter layer. This calculation is illustrated in the Examples section below.

One may determine the number of moles of metal per gram of gutter layer (Total $Mol_{metal}$/g) by adding together the weight average number of moles of metal in each metal-containing component used to form the gutter layer The molar ratio of metal:silicon is then (Total $Mol_{metal}$/g)/(Total $Mol_{si}$/g).

The radiation-curable component(s) of component (1) typically comprise at least one radiation-curable group. Radiation curable groups include ethylenically unsaturated groups (e.g. (meth)acrylic groups (e.g. $CH_2=CR^1—C(O)—$ groups), especially (meth)acrylate groups (e.g. $CH_2=CR^1—C(O)O—$ groups), (meth)acrylamide groups (e.g. $CH_2=CR^1—C(O)NR^1—$ groups), wherein each $R^1$ independently is H or $CH_3$) and especially oxetane or epoxide groups (e.g. glycidyl and epoxycyclohexyl groups).

In a preferred embodiment, component (1) of the radiation-curable composition comprises a partially crosslinked, radiation-curable polymer comprising dialkylsiloxane groups. The term 'curing' and the term 'crosslinking' are often used interchangeably throughout this document.

For brevity, the abovementioned partially crosslinked, radiation-curable polymer comprising dialkylsiloxane groups is often abbreviated below to "the PCP Polymer".

If desired, one may prevent the curable composition from permeating deeply into the porous support by any of a number of techniques. For example, one may select a curable composition which has a sufficiently high viscosity to make such permeation unlikely. With this in mind, the radiation-curable composition preferably has a viscosity of 0.1 to 500 Pa·s at 25° C., more preferably 0.1 to 100 Pa·s at 25° C.

Alternatively, the process optionally comprises the step of filling the pores of the porous support with an inert liquid before applying the radiation-curable composition to the porous support. This technique has an advantage over the first technique mentioned above in that one may form thinner membranes and more application techniques are available for radiation curable compositions of lower viscosity.

Another option for ensuring the curable composition does not permeate excessively into the porous support is to increase the hydrodynamic radius ($R_{hyd}$) of the PCP polymer. $R_{hyd}$ may be increased by increasing the extent to which the radiation-curable polymer is crosslinked. $R_{hyd}$ can be suitably determined by dynamic light scattering.

Preferably the $R_{hyd}$ of the PCP Polymer is more than half the average diameter of at least 50% of the pores at the surface of the porous support. Some degree of permeation is preferred to achieve a good adhesion.

In order to prepare a PCP Polymer, one may partially cure a composition comprising one or more curable components (e.g. monomers, oligomers and/or polymers), at least one of which comprises dialkylsiloxane groups. Preferably the partial cure is performed by a step polymerisation process.

In a preferred embodiment, at least one of the curable components used to make the PCP Polymer comprises a group which is both thermally curable and radiation curable. This is because one may then use a thermally initiated process for preparing the PCP Polymer and subsequently use a radiation initiated process to form the gutter layer.

Alternatively, the thermally curable group and the radiation curable groups are different groups and are part of the same component used to from the PCP Polymer.

If desired one may partially cure the curable components thermally to form the PCP Polymer, then stop or slow down the thermal cure process, then apply a composition containing the PCP Polymer to the support (step (i)) in the form of a composition comprising a metal complex and an inert solvent, and then irradiate the composition on the support to form the gutter layer (step (ii)). The thermal cure process may be stopped or slowed down simply by cooling (e.g. to below 30° C.) and/or diluting the composition used to make the PCP Polymer and/or by removing the catalyst if present at an appropriate time. The use of two distinct curing mechanisms, one for forming the PCP Polymer and another for curing the radiation-curable composition to form the gutter layer, makes the process flexible and suitable for large scale production of composite membranes.

Groups which are curable both thermally and by irradiation include epoxy groups and ethylenically unsaturated groups such as (meth)acrylic groups, e.g. (meth)acrylate groups and (meth)acrylamide groups.

Typically the components used to form the PCP Polymer are selected such that they are reactive with each other. For example, a component having an epoxy group is reactive with a component comprising, for example, an amine, alkoxide, thiol or carboxylic acid group. One or more of the components used to form the PCP Polymer may also have more than one curable group.

Components having an ethylenically unsaturated group may be reacted with other components by a free radical mechanism or, alternatively, with a nucleophilic component having for example one or more thiol or amine groups.

The PCP Polymer is preferably obtained by partially curing (e.g. thermally) a composition comprising:
(A) a component which is both thermally curable and radiation curable and which comprises one or more dialkylsiloxane groups;
(B) a crosslinking agent which is copolymerisable with component (A) when heated;
(C) inert solvent; and optionally
(D) a catalyst.

Preferably the amount of inert solvent present in the composition used to form the PCP Polymer is from 5 to 95 wt %, more preferably 10 to 80 wt %, especially 20 to 60 wt %, e.g. 30 wt %, 40 wt % or 50 wt %, relative to the total weight of the composition used to form the PCP Polymer. For convenience, the inert solvent present in the above composition may also act as the inert solvent present in the radiation-curable composition used in step (i) of the present process.

Component (A) preferably comprises at least three radiation-curable groups per molecule.

The alkyl groups in the dialkylsiloxane groups are preferably each independently $C_{1-4}$-alkyl groups, especially methyl groups.

Preferably component (A) is free from phenyl siloxane groups (e.g. of formula —(Si(Ph)$_2$-O)— wherein Ph is a phenyl or phenylene group).

Component (A) preferably has a number average molecular weight ("NAMW"), of 1 to 500 kDa, preferably 1 to 100 kDa, especially 2 to 50 kDa. The NAMW may be determined by any technique known in the art such as dynamic light scattering or size exclusion chromatography.

Component (A) is preferably present in an amount of 1 to 95 wt %, more preferably 5 to 75, especially 20 to 60 wt %, relative to the weight of the composition used to make the PCP Polymer.

As examples of component (A) there may be mentioned polydimethylsiloxane epoxy (meth)acrylates, polydimethylsiloxane (meth)acrylates, and allyl modified, vinyl modified, (meth)acrylic modified, epoxy-modified polydimethylsiloxanes and mixtures comprising two or more thereof.

Component (A) may also comprise several different radiation-curable components comprising one or more dialkylsilane groups.

Component (A) preferably has a kinematic viscosity of 15 to 17,000 mm$^2$/s at 25° C., more preferably 25 to 4,500 mm$^2$/s at 25° C. Component (A) also comprises one or more thermally curable groups. This is so that component (A) can cure thermally to provide the PCP Polymer. The identity of the thermally curable group(s) is not particularly limited and includes, for example epoxy groups, oxetane groups, ethylenically unsaturated groups, benzoxazine groups, naphthoxazine groups, hydroxyl groups, isocyanate groups, propargyl groups, ethynyl groups and acetylene groups. Ethylenically unsaturated groups or epoxy groups may also be used to ensure the resultant PCP Polymer is radiation-curable.

The identity of the radiation-curable group(s) is not particularly limited and includes, for example, epoxy groups, oxetane groups or ethylenically unsaturated groups such as allylic, vinylic and (meth)acrylic groups.

The thermal cure step used to make the PCP Polymer, when performed, preferably takes place at a temperature in the range 60 to 200° C., more preferably 75 to 125° C. The thermal cure reaction may be stopped by cooling and/or diluting the thermally-curable composition and/or removing the catalyst as described above to give the desired PCP Polymer. For dilution, preferably the same material is used as component (C).

The crosslinking agent is useful for increasing the hydrodynamic radius of the resultant PCP Polymer, for example to a size which is greater than the average pore size at the surface of the porous support. In this way, penetration of the PCP Polymer into the pores of the porous support is reduced without having to prior-impregnate the porous support with an inert solvent.

Examples of crosslinking agents which may be used as component (B) include: polydimethylsiloxane comprising two or more reactive groups, for example two or more groups selected from carboxylic acid, hydroxyl, thiol and/or anhydride groups, preferably polydimethylsiloxane having at least two of such groups (e.g. at both ends); (cyclo) aliphatic or aromatic di-, tri- or poly-carboxylic acids, e.g. succinic acid, glutaric acid, adipic acid, suberic acid, azelaic acid, sebacic acid, 1,2-benzenedicarboxylic acid, 1,3-benzenedicarboxylic acid, 1,4-benzenedicarboxylic acid, trimesic acid; (cyclo)aliphatic or aromatic di-, tri- or poly-thiols, e.g. 1,2-ethanedithiol, 1,4-butanedithiol, 1,6-hexanedithiol, benzene-1,2-dithiol, benzene-1,3-dithiol, benzene-1,4-dithiol, 1,2-benzenedimethanethiol, 1,3-benzenedimethanethiol, 1,4-benzenedimethanethiol or toluene-3,4-dithiol; (cyclo)aliphatic or aromatic di-, tri- or poly-amines, e.g. ethylenediamine, 1,2-diaminopropane, 1,3-diaminopropane, 1,4-diaminobutane, cadaverine, hexamethylenediamine, 1,8-diaminooctane, 1,2-bis(3-aminopropylamino)ethane, 1,2-diaminocyclohexane, 4-aminobenzylamine, o-xylylenediamine, o-phenylenediamine, m-phenylenediamine, p-phenylenediamine; or (cyclo)aliphatic or aromatic anhydrides, e.g. succinic anhydride, 3,3-dimethylglutaric anhydride, ethylenediaminetetraacetic dianhydride, glutaric anhydride, phenylsuccinic anhydride, pyromellitic dianhydride, or phthalic anhydride; metal alkoxides, e.g. alkoxides of zirconium, titanium or niobium, especially titanium (IV) isopropoxide, titanium (IV) ethoxide, zirconium propoxide and/or niobium ethoxide. Preferably the crosslinking agent comprises two (i.e. two and not more than two) reactive groups.

When component (B) is or comprises a metal complex it may also serve as the metal complex mentioned in the first aspect of the present invention.

The function of the inert solvent (C) is to provide the composition used to make the PCP Polymer with a concentration suitable for the thermal crosslinking reaction to proceed efficiently and/or to control the viscosity of the composition. Typically the inert solvent used as component (C) comprises one or more organic solvents, especially water-immiscible organic solvent(s). The inert solvent is referred to as "inert" because it is not curable.

As examples of inert solvents there may be mentioned: $C_5$-$C_{10}$ (cyclo)alkanes, benzene, alkylbenzenes (e.g. toluene), $C_3$-$C_{10}$ (optionally branched) ketones, $C_4$-$C_{10}$ cyclic ketones, $C_4$-$C_{10}$ (optionally branched) esters, $C_4$-$C_{10}$ cyclic esters, $C_4$-$C_{10}$ (optionally branched) ethers, $C_4$-$C_{10}$ cyclic ethers and especially n-heptane and n-octane. Preferably the inert solvent comprises one or more, especially from 1 to 8, of the abovementioned preferred inert solvents.

Suitable catalysts (D) include, for example, amine, phosphonium and metal compounds, e.g. amines such as 2-ethylhexylamine, bis(2-ethylhexyl)amine, dodecyldimethylamine, n, n-dimethylbenzylamine, 2-ethylimidazole, 1,8-diazabicyclo[5.4.0]undec-7-ene, tetramethyl guanidine, tetrabutylammonium chloride, benzyltrimethyl ammonium bromide, benzyltrimethyl ammonium hydroxide, tetrabutyl ammonium hydroxide, crosslinked polyvinylpyridine, and polymer bound amines such as polymer bound 1,4-diazabicyclo[2.2.2]octane hydrochloride, polymer bound 1,8-diazabicyclo[5.4.0] undec-7-ene and polymer bound tetraalkylammonium carbonate; phosphonium compounds such as tetrabutyl phosphonium bromide, pentyltriphenylphosphonium bromide, polymer bound triphenylphosphonium chloride; metal compounds such as titanium (iv) isopropoxide, diisopropoxytitanium-bis-(acetylacetonate), titanium (iv) 2-ethylhexyloxide, titanium (iv) butoxide, titanium butylphosphate, zirconium (iv) propoxide, zirconium (iv) ethoxide, zirconium (iv) acetylacetonate, zirconium (iv) bis(diethyl citrato)-dipropoxide, niobium ethoxide, aluminum acetylacetonate, aluminum lactate, bismuth octoate, calcium octoate, cerium naphthenate, chromium (iii) 2-ethylhexanoate, cobalt octoate, copper (ii) acetylacetonate, iron (iii) acetylacetonate, magnesium 2,4-pentadionate, manganese naphthenate, nickel acetylacetonate, stannous octoate, titanium ethyl acetoacetate chelate, titanium acetylacetonate chelate, titanium triethanolamine chelate, zinc acetate, zinc acetylacetonate, zinc di-2-ethylhexyldithio-phosphate, zinc nitrate, zinc octoate, zirconium 6-methylhexanedione, zirconium octoate, zirconium (iv) trifluoroacetylacetone, and the like. Catalysts generally are used in concentrations ranging from about 0.004 to about 1 wt %, preferably from about 0.01 to about 0.5 wt %, relative to the total weight of curable components. The low amount of catalyst usually corresponds with a metal:silicon ratio of lower than 0.0001.

The preferred ethylenically unsaturated groups are acrylic (acrylate or acrylamide) groups because of their fast polymerisation rates, especially when the irradiation uses UV light. Many compounds having acrylic groups are also readily available from commercial sources.

The amount of radiation-curable component(s) present in the radiation-curable composition used to form the gutter layer (i.e. component (1)) is preferably 1 to 20%, more preferably 2 to 15 wt %.

Photo-initiators may be included in the radiation-curable composition and are usually required when the curing uses UV radiation. Suitable photo-initiators are those known in the art such as radical type, cation type or anion type photo-initiators.

Cationic photo-initiators are preferred when the radiation-curable component(s) comprises curable groups such as epoxy, oxetane, other ring-opening heterocyclic groups or vinyl ether groups.

Preferred cationic photo-initiators include organic salts of non-nucleophilic anions, e.g. hexafluoroarsinate anion, antimony (V) hexafluoride anion, phosphorus hexafluoride anion and tetrafluoroborate anion. Commercially available cationic photo-initiators include UV-9380c, UV-9390c (manufactured by Momentive performance materials), UVI-6974, UVI-6970, UVI-6990 (manufactured by Union Carbide Corp.), CD-1010, CD-1011, CD-1012 (manufactured by Sartomer Corp.), Adekaoptomer™ SP-150, SP-151, SP-170, SP-171 (manufactured by Asahi Denka Kogyo Co., Ltd.), Irgacure™ 250, Irgacure™ 261 (Ciba Specialty Chemicals Corp.), CI-2481, CI-2624, CI-2639, CI-2064 (Nippon Soda Co., Ltd.), DTS-102, DTS-103, NAT-103, NDS-103, TPS-103, MDS-103, MPI-103 and BBI-103 (Midori Chemical Co., Ltd.). The above mentioned cationic photo-initiators can be used either individually or in combination of two or more.

Radical Type I and/or type II photo-initiators may also be used when the curable group comprises an ethylenically unsaturated group, e.g. a (meth)acrylate or (meth)acrylamide.

Examples of radical type I photo-initiators are as described in WO 2007/018425, page 14, line 23 to page 15, line 26, which are incorporated herein by reference thereto.

Examples of radical type II photo-initiators are as described in WO 2007/018425, page 15, line 27 to page 16, line 27, which are incorporated herein by reference thereto.

For (meth)acrylic groups type I photo-initiators, especially alpha-hydroxyalkylphenones, such as 2-hydroxy-2-methyl-1-phenyl propan-1-one, 2-hydroxy-2-methyl-1-(4-tert-butyl-) phenylpropan-1-one, 2-hydroxy-[4'-(2-hydroxypropoxy)phenyl]-2-methylpropan-1-one, 2-hydroxy-1-[4-(2-hydroxyethoxy)phenyl]-2-methyl propan-1-one, 1-hydroxycyclohexylphenylketone and oligo[2-hydroxy-2-methyl-1-{4-(1-methylvinyl) phenyl}propanone], alpha-aminoalkylphenones, alpha-sulfonylalkylphenones and acylphosphine oxides such as 2,4,6-trimethylbenzoyl-diphenylphosphine oxide, ethyl-2,4, 6-trimethylbenzoyl-phenylphosphinate and bis(2,4,6-trimethylbenzoyl)-phenylphosphine oxide, are preferred.

The amount of photo-initiator present in the radiation-curable composition used to form the gutter layer (i.e. component (2)) is preferably 0.005 to 2 wt %, more preferably 0.01 to 1 wt %.

Preferably the weight ratio of component (2) to (1) in the radiation-curable composition is between 0.001 and 0.2 to 1, more preferably between 0.002 and 0.1 to 1. A single type of photo-initiator may be used but also a combination of several different types.

When no photo-initiator is included in the radiation-curable composition, the composition can be advantageously cured by electron-beam exposure. Preferably the electron beam output is between 50 and 300 keV. Curing can also be achieved by plasma or corona exposure.

The function of the inert solvent (3) is to provide the radiation-curable composition with a viscosity suitable for the particular method used to apply the curable composition to the porous support. For high speed application processes one will usually choose an inert solvent of low viscosity. Examples of suitable inert solvents are mentioned above in relation to preparation of the PCP Polymer.

The amount of inert solvent present in the radiation-curable composition used to form the gutter layer (i.e. component (3)) is preferably 70 to 99.5 wt %, more preferably 80 to 99 wt %, especially 90 to 98 wt %.

Inert solvents are not radiation-curable.

The metal complex included in the radiation-curable composition as component (4) can provide the necessary metal in that composition and in the gutter layer.

The metal is preferably selected from the groups 2 to 16 of the periodic table (according the IUPAC format), including transition metals. Examples of such metals include: Be, Mg, Ca, Sr, Ba, Sc, Y, La, Ce, Pr, Nd, Pm, Sm, Eu, Gd, Tb, Dy, Ho, Er, Tm, Yb, Lu, Ti, Zr, Hf, V, Nb, Ta, Cr, Mo, W, Mn, Re, Fe, Ru, Os, Co, Rh, Ir, Ni, Pd, Pt, Cu, Zn, Cd, B, Al, Ga, In, Tl, Si, Ge, Sn, Pb, As, Sb, Bi, Se, Te. More preferred are Mg, Ca, Sr, Ba, Sc, Y, La, Ce, Pr, Nd, Sm, Gd, Dy, Ho, Er, Tm, Yb, Ti, Zr, Hf, V, Nb, Ta, Cr, Mo, W, Mn, Fe, Ru, Co, Ir, Ni, Zn, B, Al, Ga, In, Si, Ge, Sn, As, Sb, Bi, Se and Te and mixtures comprising two or more thereof (the phrase "a metal" is not intended to be limited to just one metal and includes the possibility of two or more metals being present). Preferably the metal is not platinum. When determining the a metal:silicon ratio experimentally, silicon is not regarded as a metal.

From commercial availability point of view, metals from the groups 3, 4, 5, 13 and/or 14 of the periodic table are preferred, more preferably Ti, Zr, V, Nb, Al, Ce and Sn, especially metals from group 4 and 5, e.g. Ti, Zr, Hf, V and Nb.

The metal preferably has a positive charge of at least two, more preferably the metal is trivalent (charge of $3^+$), tetravalent (charge of $4^+$) or pentavalent (charge of $5^+$).

The metal complex, when used, may also comprise two or more different metal ions, e.g. as in barium titanium alkoxide, barium yttrium alkoxide, barium zirconium alkoxide, aluminum yttrium alkoxide, aluminum zirconium alkoxide, aluminum titanium alkoxide, magnesium aluminum alkoxide, aluminum zirconium alkoxide and lithium tantalum alkoxide.

The metal complex preferably comprises a metal (e.g. as described above) and a halide or an organic ligand, for example an organic ligand comprising one or more donor atoms which co-ordinate to the metal. Typical donor atoms are oxygen, nitrogen and sulphur, e.g. as found in hydroxyl, carboxyl, ester, amine, azo, heterocyclic, thiol, and thioalkyl groups.

The ligand(s) may be monodentate or multidentate (i.e. the ligand has two or more groups which co-ordinate with the metal).

In a particularly preferred embodiment the metal complex comprises a metal and an organic ligand comprising an alkoxide and/or an optionally substituted 2,4-pentanedionate group and/or a carboxyl group (e.g. a neodecanoate group).

The metal complex may also comprise one or more inorganic ligands, in addition to the organic ligand(s), and optionally one or more counterions to balance the charge on the metal. For example the metal complex may comprise a halide (e.g. chloride or bromide) or water ligand.

Preferably the metal complex has a coordination number of 2 to 6, more preferably 4 to 6 and especially 4 or 6.

Preferably the organic ligand is one which can be easily removed from the surface of the gutter layer by drying or washing after the gutter layer has been formed. The parts of the metal complex which are not at or near the surface of the gutter layer may remain within the gutter layer even after it has been washed.

When the metal in the gutter layer is derived from a metal complex, some or all of the ligand present in the complex is usually replaced by ligating groups present in the gutter layer. When the metal complex comprises tri- or higher-valent metal then ligating groups present in the gutter layer are less likely to replace all the original ligands than when the metal has a valency of less than three.

Preferably the metal complex comprises an organic ligand having a molecular weight below 150 Daltons, more preferably below 120 Daltons.

Examples of suitable organic ligands include compounds comprising groups selected from $C_{1-8}$-alkoxy groups (e.g. methoxy, ethoxy, propoxy, butoxy and hexoxy groups); hydroxyl groups; $C_{1-6}$-thioalkyl groups (e.g. —SCH$_3$, —SCH$_2$CH$_3$ and —SCH$_2$CH$_2$CH$_3$); thiol groups; 2,4-pentanedionate groups (e.g. hexafluoro-2,4-pentanedionate and 3,5-heptanedionate); carboxyl groups (e.g. 2-ethylhexanoate and neodecanoate); amine groups (e.g. an —NH$_2$ group or a secondary amino group (e.g. NH—($C_{1-6}$-alkyl group)) or a tertiary amino group (e.g. pyridinyl)); azo groups (—N═N—); aryloxy groups (e.g. an optionally substituted phenoxy or naphthyloxy group) and compounds comprising two or more of the aforementioned groups (e.g. triethanolamine). Particularly preferred groups are $C_{2-4}$-alkoxides, e.g. ethoxide, n-propoxide, isopropoxide, butoxide, methoxypropoxide and methoxyethoxide, 1,3 diketones, e.g. 2,4-pentanedionate (acetylacetonate) and acetoacetate groups, and derivatives thereof. Typically such groups are coordinated to the metal through one or more covalent bonds and/or lone pairs of electrons (e.g. as per the lone pair in -ö-).

Examples of preferred metal complexes include titanium tetra-isopropoxide, titanium tetraethoxide, titanium diisopropoxide bis(2,4-pentanedionate), titanium 2-ethylhexoxide, titanium n-propoxide, titanium (IV) butoxide, titanium (IV) ethyl acetoacetate, titanium (IV) acetylacetonate, titanium diisopropoxy bis(2-ethyl-1,3-hexanediolate, titanium diisopropoxy bisethylacetoacetate, titanium (IV) ethoxide isopropoxide bis(acetylactonate), titanium dibutoxy bis(triethanolaminate), titanium bis(triethanolamine)diisopropoxide, zirconium ethoxide, zirconium diisopropoxide bis(2,2,6,6-tetra-methyl-3,5-heptanedionate), zirconium 2-ethylhexoxide, zirconium 2-methoxymethyl-2-propoxide, zirconium 2,4-pentanedionate, zirconium n-propoxide, zirconium isopropoxide, zirconium 3,5-heptanedionate, zirconium hexafluoro-2,4-pentanedionate, zirconium(IV) bis(diethyl citrato)dipropoxide, zirconium tributoxide monoacetylacetonate, zirconium dibutoxide bisacetylacetonate, zirconium butoxide trisacetylacetonate, zirconium tributoxide monoethylacetoacetate, zirconium dibutoxide bisethylacetoacetate, zirconium butoxide trisethylacetoacetate, zirconium tetraethylacetoacetate, zirconium tri-isopropoxy tetramethylheptanedionate dimer, hafnium (IV) n-butoxide, hafnium (IV) tert-butoxide, hafnium (IV) isopropoxide, vanadium (III) acetylacetonate, vanadium (V) oxytriisopropoxide, vanadyl acetylacetonate, vanadium (V) oxytripropoxide, vanadium (V) oxytriethoxide, niobium ethoxide, niobium n-butoxide, niobium isopropoxide, niobium n-propoxide, tantalum isopropoxide, tantalum ethoxide, tantalum tetraethoxy pentanedionate, aluminium ethoxide, aluminium s-butoxide, aluminium di-s-butoxide ethylacetoacetate, aluminium di-sec-butoxy acetylacetonate, aluminium diisopropoxide ethylacetoacetate, aluminium isopropoxide, aluminium (iii) 2,4-pentanedionate, aluminium trisethylacetoacetate, aluminium acetylacetonate bisethylacetoacetate, cerium isopropoxide, cerium 2,4-pentadienoate, cerium hexafluoroisopropoxide, bis(2-ethylhexanoate)tin and tetra(isopropoxy) tin.

Preferably the curable composition comprises 0.01 to 5 wt %, more preferably 0.01 to 2 wt %, especially 0.02 to 1 wt % of metal complex. The radiation-curable composition may contain other components, for example surfactants, surface tension modifiers, viscosity enhancing agents, biocides and/or other components capable of co-polymerisation with the other ingredients.

The composite membrane preferably has a pure water permeability at 20° C. of less than $6.10^{-8}$ m$^3$/m$^2$·s·kPa, more preferably less than $3.10^{-8}$ m$^3$/m$^2$·s·kPa.

The overall dry thickness of the composite membrane is preferably 20 to 500 μm, preferably from 100 to 300 μm.

The composite membrane is preferably in tubular form or, more preferably, in sheet form. Tubular forms of membrane are sometimes referred to as being of the hollow fibre type. Membranes in sheet form are suitable for use in, for example, spiral-wound, plate-and-frame and envelope cartridges.

According to a second aspect of the present invention there is provided a gas separation cartridge comprising a composite membrane according to the first aspect of the present invention.

A third aspect of the present invention provides a gas separation module for separating a feed gas containing a target gas into a gas stream rich in the target gas and a gas stream depleted in the target gas, the module comprises a housing and one or more cartridges comprising a composite membrane according to the present invention.

A still further aspect of the present invention provides method for separating a feed gas containing a target gas into a gas stream rich in the target gas and a gas stream depleted in the target gas, which method comprises contacting the feed gas with a membrane according to the first aspect of the present invention (e.g. using a gas separation cartridge according to the second aspect of the present invention or a gas separation module according to the third aspect of the present invention) and collecting the gas which passes through the membrane and/or the gas which does not pass through the membrane.

Preferred gas separation modules comprise a composite membrane according to the first aspect of the present invention are in the form of a spiral-wound cartridge. Such spiral-wound cartridges preferably comprise spacers and outer impermeable support layers, the spacers being positioned on each side of the membrane and between the membrane and the impermeable support layer and thereby defining a feed channel on one side of the membrane and a permeate channel on the other side of the membrane, wherein the membrane, spacers and outer impermeable layers are wound in a spiral manner around a core.

The spacers are typically, but not necessarily, made from plastic mesh or netting, which helps to promote turbulent flow in the gas channels. In manufacturing spiral-wound cartridges, care is taken in the choice of spacers. An overly tight mesh may result in pressure drops along the feed or permeate channel that adversely affect separation performance when the cartridge is in use. Likewise, a tight spacer may facilitate the formation of stagnant boundary layers that give rise to concentration polarisation adjacent to the membrane surface. Similar issues affect the manufacture of plate-and-frame cartridges.

The preferred cartridge geometries therefore include plate-and-frame, spiral-wound, hollow-fiber, tubular and envelope type. More information on cartridge geometries can be found in "Membrane Technology in the Chemical Industry", edited by S. P. Nunes and K. V. Peinemann, page 76-78 and page 101-103 and in "Membrane Technology and Applications" (second edition), edited by R. Baker, page 139-155.

While this specification emphasises the usefulness of the membranes of the present invention for separating gases, especially polar and non-polar gases, it will be understood that the membranes can also be used for other purposes, for example providing a reducing gas for the direct reduction of iron ore in the steel production industry, dehydration of organic solvents (e.g. ethanol dehydration), pervaporation, oxygen enrichment, solvent resistant nanofiltration and vapour separation.

The composite membrane of the invention may be used in conjunction with other membranes or with other gas separation techniques if desired, e.g. with solvent absorption (e.g. Selexol, Rectisol, Sulfinol, Benfield), amine absorption (e.g. DEA, MDEA), physical adsorption, e.g. pressure swing adsorption, cryogenic techniques, etc.

The composite membranes are particularly suitable for separating a feed gas containing a target gas into a gas stream rich in the target gas and a gas stream depleted in the target gas. For example, a feed gas comprising polar and non-polar gases may be separated into a gas stream rich in polar gases and a gas stream depleted in polar gases. In many cases the membranes have a high permeability to polar gases, e.g. $CO_2$, $H_2S$, $NH_3$, $SO_x$, and nitrogen oxides, especially $NO_x$, relative to non-polar gases, e.g. alkanes, $H_2$, $N_2$, and water vapour.

The target gas may be, for example, a gas which has value to the user of the membrane and which the user wishes to collect. Alternatively the target gas may be an undesirable gas, e.g. a pollutant or 'greenhouse gas', which the user wishes to separate from a gas stream in order to meet product specification or to protect the environment.

The composite membranes are particularly useful for purifying natural gas (a mixture which predominantly comprises methane) by removing polar gases ($CO_2$, $H_2S$); for purifying synthesis gas; and for removing $CO_2$ from hydrogen and from flue gases. Flue gases typically arise from fireplaces, ovens, furnaces, boilers, combustion engines and power plants. The composition of flue gases depend on what is being burned, but usually they contain mostly nitrogen (typically more than two-thirds) derived from air, carbon dioxide ($CO_2$) derived from combustion and water vapour as well as oxygen. Flue gases also contain a small percentage of pollutants such as particulate matter, carbon monoxide, nitrogen oxides and sulphur oxides. Recently the separation and capture of $CO_2$ has attracted attention in relation to environmental issues (global warming).

The composite membranes of the invention are particularly useful for separating the following: a feed gas comprising $CO_2$ and $N_2$ into a gas stream richer in $CO_2$ than the feed gas and a gas stream poorer in $CO_2$ than the feed gas; a feed gas comprising $CO_2$ and $CH_4$ into a gas stream richer in $CO_2$ than the feed gas and a gas stream poorer in $CO_2$ than the feed gas; a feed gas comprising $CO_2$ and $H_2$ into a gas stream richer in $CO_2$ than the feed gas and a gas stream poorer in $CO_2$ than the feed gas, a feed gas comprising $H_2S$ and $CH_4$ into a gas stream richer in $H_2S$ than the feed gas and a gas stream poorer in $H_2S$ than the feed gas; and a feed gas comprising $H_2S$ and $H_2$ into a gas stream richer in $H_2S$ than the feed gas and a gas stream poorer in $H_2S$ than the feed gas.

Preferably the composite membrane has a $CO_2/CH_4$ selectivity ($\alpha CO_2/CH_4$)>10. Preferably the selectivity is determined by a process comprising exposing the membrane to a 13/87 mixture by volume of $CO_2$ and $CH_4$ at a feed pressure of 6000 kPa at 40° C.

The following materials were used in the Examples (all without further purification):

PAN is a porous support (polyacrylonitrile L10 ultrafiltration membrane from GMT Membrantechnik GmbH, Germany).

HI is a non-woven porous support Hi-star 05TH-100 of thickness 150 μm from Hirose paper MFG Co. Ltd.

X-22-162C is a dual end reactive silicone having carboxylic acid reactive groups, a viscosity of 220 mm$^2$/s and a reactive group equivalent weight of 2,300 g/mol] from Shin-Etsu Chemical Co., Ltd. (MWT 4,600).

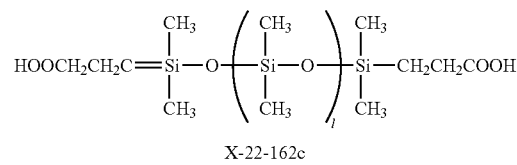

X-22-162c

DBU is 1,8-diazabicyclo[5.4.0]undec-7-ene from Sigma Aldrich.

UV9300 is SilForce™ UV9300 from Momentive Performance Materials Holdings having an epoxy equivalent weight of 950 g/mole oxirane (MWT 9,000, determined by viscometry).

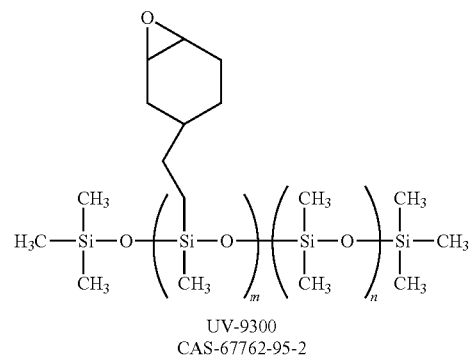

UV-9300
CAS-67762-95-2

UV9390C is SilForce™ UV-9390C from Momentive Performance Materials Holdings.
Ti(OiPr)$_4$ is titanium (IV) isopropoxide from Sigma Aldrich.
n-heptane is n-heptane from Brenntag Nederland BV.
MEK is 2-butanone from Brenntag Nederland BV.
MIBK is methylisobutyl ketone from Brenntag Nederland BV.
APTMS is 3-trimethoxysilylpropan-1-amine from Sigma Aldrich.
APTES is 3-triethoxysilylpropan-1-amine from Sigma Aldrich.
THF is tetrahydrofuran from Brenntag Nederland BV.
PI1: is 6FDA-TeMPD$_x$/DABA$_y$, x/y=20/80; obtained from FUJIFILM Corporation, having the following structure:

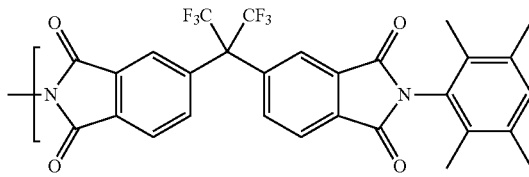
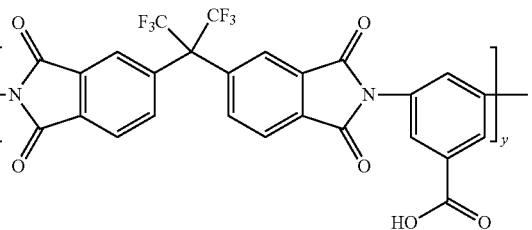

PI2: is 6FDA-TeMPD; obtained from FUJIFILM Corporation, having the following structure:

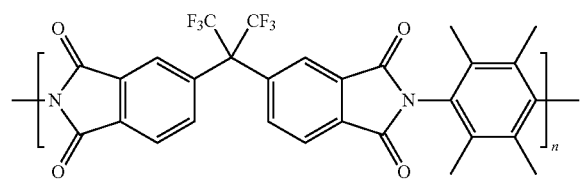

CA is cellulose acetate CA-398-3 from Eastman Chemicals.
Evaluation of Gas Flux and Selectivity
(A) Gas Flux
The flux of CH$_4$ and CO$_2$ through the composite membranes was measured at 40° C. and gas feed pressure of 6000 kPa using a gas permeation cell with a measurement diameter of 3.0 cm and a feed gas composition of 13 v/v % CO$_2$ and 87 v/v % CH$_4$.
The flux of each gas was calculated based on the following equation:

$$Q_i = (\theta_{Perm} \cdot X_{Perm,i})/(A \cdot (P_{Feed} \cdot X_{Feed,i} - P_{Perm} \cdot X_{Perm,i}))$$

Where:
$Q_i$=Flux of each gas (m$^3$(STP)/m$^2$·kPa·s)
$\theta_{Perm}$=Permeate flow (m$^3$(STP)/s)
$X_{Perm,i}$=Volume fraction of each gas in the permeate
A=Membrane area (m$^2$)
$P_{Feed}$=Feed gas pressure (kPa)
$X_{Feed,i}$=Volume fraction of each gas in the feed
$P_{Perm}$=Permeate gas pressure (kPa)
STP is standard temperature and pressure, which is defined here as 25.0° C. and 1 atmosphere (101.325 kPa).
(B) Selectivity
The selectivity ($\alpha_{CO2/CH4}$) for the composite membranes was calculated from $Q_{CO2}$ and $Q_{CH4}$ calculated above, based on following equation:

$$\alpha_{CO2/CH4} = Q_{CO2}/Q_{CH4}$$

(C) Peeling Force ("PF")
Adhesive tape (Saint-Gobain CHR® M741 polyester film backing silicone adhesive pressure sensitive tape, 20 cm-long×1.5 cm-wide) was applied to the surface of the composite membrane under test and a 1 Kg roller was applied thereto at 23° C. and a relative humidity of 50% for 1 minute. The composite membrane was firmly fixed in place and 2.5 cm of the tape was then peeled from the composite membrane and attached to a tensile testing machine (Zwick Z010) at an angle of 180°. 75 mm of the tape was then peeled off, still at an angle of 180, at a speed of 5 cm/min. The data from the first 2.5 cm were ignored to ensure the test results were comparable and stable and the average force for the remaining 5 cm tape removal was calculated. The adhesive tape was inspected to check whether any layers had been removed from the composite membrane. The force was increased until an inspection of the tape revealed that at least some of the composite membrane layer(s) had been removed and was stuck on the tape. The force required to remove at least some of the composite membrane layer(s) was noted, up to a maximum tested peeling force of 2.5 N/1.5 cm.
(D) Selectivity after 50 Pressurisation Cycles ("Robustness")
The composite membrane under test was pressurised to 6000 kPa 10 minutes, depressurised to atmospheric pressure for 10 minutes and this pressurise/depressurise cycle was performed for a total of 50 times. The selectivity of the membrane was then measured as described in (B) above. No change or a small change in selectivity after the 50 cycles indicated that the composite membrane was robust, whereas a large change in selectivity indicated that the composite membrane was less robust.

EXAMPLES 1 TO 5 AND COMPARATIVE EXAMPLES 1 TO 7

Step A)—Preparation of Partially Cured Polymer
The components UV9300, X-22-162C and DBU in the amounts indicated in Table 1 were dissolved in n-heptane and maintained at a temperature of 95° C. for 168 hours to form a solution of a partially cured polymer (PCP Polymer) having a viscosity of 22.8 mPas at 25.0° C.

TABLE 1

| Preparation of the PCP Polymer | | |
|---|---|---|
| | Ingredient | Amount (wt %) |
| Preparation of the PCP Polymer | UV9300 | 39.078 |
| | X-22-162C | 10.789 |
| | DBU | 0.007 |
| | n-Heptane | 50.126 |

Step B)—Preparation of Radiation-Curable Compositions
The solution of PCP Polymer described prepared in Step A) was cooled to 20° C. and diluted using n-heptane to the PCP Polymer concentration of 5 wt %. The solution was then filtered through a filter paper having a pore size of 2.7 µm and photoinitiator UV9390C and a metal complex (Ti(OiPr)$_4$) were then added in the amounts indicated in Table 1 to give a radiation-curable composition.

TABLE 2

Preparation of the Radiation-curable Composition

| | Ingredient | Amount (wt %) |
|---|---|---|
| Preparation of radiation-curable composition | PCP Polymer concentration in curable composition | 5.00 |
| | UV9390c | 0.10 |
| | Ti(OiPr)$_4$ | 0.1 |

Step C1)—Forming the Gutter Layer

CGL1

The radiation-curable composition prepared in Step B) was applied to a porous support (PAN) by spin coating, cured using a Light Hammer LH10 from Fusion UV Systems fitted with a D-bulb with an intensity of 24 kW/m and then dried. This resulted in a porous support carrying a gutter layer which had not been activated, hereinafter referred to as CGL1 (i.e. comparative gutter layer 1). CGL1, which had not been activated, was used in the Comparative Examples. Also CGL1 was used to prepare activated gutter layers as described in more detail below.

Step C2)—Preparing Activated Gutter Layers

AGL1

The gutter layer present in a sample of CGL1 was activated by subjecting the gutter layer to a corona treatment under an atmosphere of air, using a Softal™ corona VTG250 apparatus at a specific energy of 16 J/cm$^2$ using ceramic electrodes coupled to a Softal™ VTG3005 generator. The resultant support carrying an activated gutter layer is hereinafter referred to as AGL1 (i.e. activated gutter layer 1).

AGL2

The gutter layer present in a sample of CGL1 was activated by subjecting the gutter layer to an atmospheric plasma glow discharge treatment using the apparatus described in WO2014029963, Example 1 and shown in FIG. 1, except a bigger gap was used of 3.0 mm. The following specific conditions were used:

Gas composition: N$_2$/O$_2$ 15/0.05 standard liters per minute flow.

Electrode gap: 3.0 mm.

Excitation 300 W (pulsed; 50% duty cycle) with a specific energy of 12 J/cm$^2$.

The plasma was stabilized by a stabilization circuit as described in U.S. Pat. No. 6,774,569, experiment 2, page 8, lines 17 to 24, wherein a Ferrite choke coil of a material type 3F3 was used having an induction of 6 mH in series connected to the lower electrode 14 and power supply 15 as shown in FIG. 7 in order to obtain a very stable atmospheric glow discharge plasma without streamer or filamentary discharges. This resulted in AGL2 (i.e. activated gutter layer 2).

AGL3

The method described above for AGL2 was repeated except that the duty cycle was 0% (plasma switched off) and ozone gas was injected in the gap (1 mg/cm$^2$ DL8 substrate) while the electrodes were heated to 90° C. This resulted in AGL3 (i.e. activated gutter layer 3).

Step D)—Forming a Discriminating Layer (DL) on the Gutter Layers

Compositions DL1 to DL5 (used subsequently to make discriminating layers) were prepared by mixing the ingredients indicated in Table 3:

TABLE 3

| Ingredient (wt %) | DL1 | DL2 | DL3 | DL4 | DL5 |
|---|---|---|---|---|---|
| PI1 | 1.50 | — | — | 1.50 | 1.50 |
| PI2 | — | 1.50 | 1.50 | — | — |
| MethylTriacetoxy silane | — | — | 0.015 | — | — |
| APTMS | — | — | — | 0.015 | — |
| APTES | — | — | — | — | 0.015 |
| MIBK | 4.515 | 4.515 | 4.50 | 4.50 | 4.50 |
| THF | 7.485 | 7.485 | 7.485 | 7.485 | 7.485 |
| MEK | 86.50 | 86.50 | 86.50 | 86.50 | 86.50 |

Each of the compositions DL1 to DL5 was spin-coated onto the gutter layer of the porous support indicated in Table 5 to form a discriminating layer of thickness 90 nm on the previously formed gutter layer. DL4 and DL5 contained both amine and Si-groups. DL3 contained silicon atoms but no amine groups. DL1 and DL2 did not contain amine groups and did not contain silicon atoms.

In addition, DL6 was prepared by according the recipe shown in Table 4 below:

TABLE 4

DL6 Recipee

| Ingredient (wt %) | DL6 |
|---|---|
| CA | 24.0 |
| Acetone | 47.5 |
| Formamide | 19.0 |
| Maleic acid | 9.5 |

This DL6 recipe was coated 1 mm thick on top of HI support and dried by evaporating the acetone in dry environment for 18 seconds. The resultant discriminating layer DL6 did not contain amine groups and did not contain silicon atoms.

The HI-DL6 composite was then immersed in cold water (about 2° C.), washed with water at room temperature to remove any residual solvents and solvent exchanged (first with isopropyl alcohol and than with hexane). The hexane was then evaporated by dry air at 25° C. to obtain dry the composite membrane CEx 5 having a total thickness of 2 mm.

CEx6 was prepared in an analogous manner to CEx5 except that on top of the discriminating layer there is applied a protective layer using the method described above in Step E).

Optional Step E)—Formation of the Protective layer (PL)

In addition, in Examples 1, 2, 4 and 5 and CEx1, CEx2, CEx3, CEx6 and CEx7 the radiation-curable composition described above in Step B) was applied to the discriminating layer, cured thereon using a Light Hammer LH10 from Fusion UV Systems fitted with a D-bulb with an intensity of 24 kW/m and dried to form a protective layer thereon of thickness 600 nm, as indicated in Table 5 below.

The composite membranes prepared in accordance with steps A) to D) or A) to E) above are shown in Table 5 below, along with the results of flux, selectivity, robustness and peeling force tests as described above:

TABLE 5

|  | Ex1 | Ex2 | Ex3 | Ex4 | Ex5 |
|---|---|---|---|---|---|
| Membrane layers | PAN/AGL1/DL4/PL | PAN/AGL1/DL5/PL | PAN/AGL1/DL4 | PAN/AGL2/DL4/PL | PAN/AGL3/DL4/PL |
| Gas Flux (GPU) | 45 | 47 | 55 | 45 | 45 |
| Initial $\alpha_{CO2/CH4}$ | 30 | 27 | 24 | 29 | 29 |
| $\alpha_{CO2/CH4}$ after 50 Pressurisation Cycles | 32 | 29 | 25 | 29 | 25 |
| PF (N/1.5 cm) | >2.5 | >2.5 | >2.5 | >2.5 | >2.5 |

|  | CEx1 | CEx2 | CEx3 | CEx4 | CEx5 | CEx6 | CEx7 |
|---|---|---|---|---|---|---|---|
| Membrane layers | PAN/AGL1/DL1/PL | PAN/AGL1/DL2/PL | PAN/AGL1/DL3/PL | PAN/AGL1 | HI/DL6 | HI/DL6/PL | PAN/CGL/DL4/PL |
| Gas Flux (GPU) | 53 | 42 | 45 | 2050 | 80 | 68 | 57 |
| Initial $\alpha_{CO2/CH4}$ | 23 | 27 | 26 | 2 | 15 | 18 | 28 |
| $\alpha_{CO2/CH4}$ after 50 Pressurisation Cycles | 4 | 5 | 15 | 2 | 15 | 18 | 18 |
| PF (N/1.5 cm) | 0.2 | 0.2 | 1.2 | — | 1.8 | 1.8 | 1.5 |

Notes:
CGL1 is the unactivated (comparative) gutter layer described above in step C1).
AGL is the activated gutter layer described above in step C2).
DL is the discriminating layer obtained from the indicated composition and PL (when present) is the protective layer obtained in step E).
A small change in the $\alpha_{CO2/CH4}$ after 50 Pressurisation Cycles (compared to the initial $\alpha_{CO2/CH4}$) indicated good membrane robustness.
The layer thicknesses were determined by ellipsometry and in some cases were verified using SEM.

The invention claimed is:

1. A composite gas membrane comprising:
   a) a porous support;
   b) an activated gutter layer;
   c) a discriminating layer; and
   d) optionally a protective layer;
   wherein each of the said layers remains in place when a peeling force of 2.5 N/1.5 cm is applied to an outermost of said layers.

2. The composite membrane according claim 1 wherein the gutter layer has been activated by a process comprising a corona treatment, plasma treatment, flame treatment and/or ozone treatment.

3. The composite membrane according claim 1 wherein the discriminating layer contains amine groups.

4. The composite membrane according to claim 1 wherein the discriminating layer further comprises silicon atoms.

5. The composite membrane according to claim 1 wherein gutter layer comprises a polymer and/or dialkylsiloxane groups.

6. The composite membrane according to claim 1 wherein the discriminating layer comprises a group comprising an amine group, a silicon atom and an alkylene group wherein the silicon atom and the amine group are linked together by the alkylene group.

7. The composite membrane according to claim 1 wherein the discriminating layer is formed from ingredients comprising an alkoxy silane compound comprising an amine group.

8. The composite membrane according to claim 1 wherein the discriminating layer further comprises a —CF$_3$ group.

9. The composite membrane according to claim 1 wherein the discriminating layer has been obtained from a composition which is free from silane compounds comprising acetoxy-groups.

10. The composite membrane according to claim 3 which comprises protective layer d) comprising carboxylic acid groups.

11. A method for separating a feed gas containing a target gas into a gas stream rich in the target gas and a gas stream depleted in the target gas, which method comprises contacting the feed gas with a membrane according to claim 1 and collecting the gas which passes through the membrane and/or the gas which does not pass through the membrane.

12. The composite membrane according claim 1 wherein (i) the gutter layer has been activated by a process comprising a corona treatment, plasma treatment, flame treatment and/or ozone treatment; (ii) the discriminating layer contains amine groups and silicon atoms; and (iii) the gutter layer comprises dialkylsiloxane groups.

13. The composite membrane according to claim 12 wherein the discriminating layer comprises a —CF$_3$ group and the discriminating layer is formed from ingredients comprising an alkoxy silane compound, which alkoxy silane compound comprises an amine group.

14. The composite membrane according to claim 12 wherein the discriminating layer has been obtained from a composition which is free from silane compounds comprising acetoxy-groups.

15. The composite membrane according to claim 12 which further comprises the protective layer d) and said protective layer comprises carboxylic acid groups.

16. The composite membrane according to claim 12 which further comprises the protective layer d) and said protective layer comprises carboxylic acid groups, wherein (iv) the discriminating layer comprises a —CF$_3$ group; (v) the composition used to form the discriminating layer comprises an alkoxy silane compound, which alkoxy silane compound comprises an amine group; (vi) the composition used to form the discriminating layer is free from silane compounds comprising acetoxy-groups.

17. A gas separation cartridge comprising a composite membrane according to claim 16.

18. A gas separation module for separating a feed gas containing a target gas into a gas stream rich in the target gas and a gas stream depleted in the target gas, the module comprises a housing and one or more cartridges according to claim 17.

* * * * *